United States Patent [19]
Yanagisawa

[11] Patent Number: 5,279,178
[45] Date of Patent: Jan. 18, 1994

[54] TWO DIMENSIONAL DRIVE SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 956,103

[22] Filed: Oct. 2, 1992

[30] Foreign Application Priority Data

Oct. 17, 1991 [JP] Japan .................. 3-298218

[51] Int. Cl.⁵ .................. G05G 11/00; B25J 9/02
[52] U.S. Cl. .................. 74/479 PH; 108/20; 108/143; 414/749
[58] Field of Search ............ 74/479 PH; 33/1 M; 108/20, 143; 248/661; 414/749; 901/16

[56] References Cited

U.S. PATENT DOCUMENTS 4,260,319 4/1981 Motoda et al. .................. 414/749 X
4,995,277 2/1991 Yanagisawa .................. 74/89.15

FOREIGN PATENT DOCUMENTS

2-134443 5/1990 Japan .

*Primary Examiner*—Allan D. Herrmann

[57] ABSTRACT

The present invention relates to a two dimentional drive system. The drive system comprises a pair of guides provided on a base, the guides arranged in parallel in the X-direction; a rod arranged in the Y-direction, each end of the rod being slidably attached to the guides. A moving body is capable of moving on the rod. A first motor, which has a first shaft, is provided for rotating the first shaft. The first motor is provided to the base. A second motor, which has a second shaft, is provided for rotating the second shaft, the second motor is provided to the moving body. A first link includes a first end and a second end, the first end of the first link is connected to the first shaft. A second link includes a first end and a second end. The first end of the second link is connected to the second shaft. The second end of the second link is rotatably connected to the second end of the first link. In the present invention, the drive system has no ball bearing screws, so that the manufacturing cost and noise during operation can be lower.

14 Claims, 7 Drawing Sheets

TWO DIMENSIONAL DRIVE SYSTEM

BACKGROUND OF THE INVENTION Field of the Invention

The present invention relates to a drive system, more precisely relates to a drive system, which is capable of moving a moving body in a plane. Description of Background Art Many kinds of two dimentional drive systems have been disclosed. The inventor of the present invention, has filed several two dimentional drive systems (see U.S. Pat. No. 4,995,277, Japanese Patent Kokai Gazette No. 2-1344 43).

Each conventional two dimentional drive system has ball bearing screws, which are arranged in X-Y directions, and a driving mechanism for selectively driving the ball bearing screws so as to move a moving body in a plane.

The conventional drive systems have high positioning accuracy of the moving body because of using the ball bearing screws, but have the following disadvantages: Firstly, the driving mechanism including the ball bearing screws, gears, etc., create noise which occurs in the driving mechanism. Secondly, three or four ball bearing screws must be assembled in each drive system, but the ball bearing screws are expensive, so the manufacturing cost of the conventional drive systems must be higher.

SUMMARY OF THE INVENTION

An object of the present invention is to provide a two dimensional drive system whose manufacturing cost and noise are lower.

To achieve the object, the present invention has following basic structures:

A first structure is a two dimensional drive system including a base and a pair of guides being provided on the base, the guides being arranged in parallel in an X-direction. A rod is arranged in a Y-direction perpendicular to the X-direction, each end of the rod is slidably attached to each of the guides whereby the rod is capable of moving along the guides in the X-direction. A moving body is capable of moving on the rod in the Y-direction. A first driving means, which has a first shaft, is provided for rotating the first shaft, the first driving means is provided to the base. A second driving means, which has a second shaft, is provided for rotating the second shaft, the second driving means is provided to the moving body. A first link having a first end and a second end is provided wherein the first end of the first link is connected to the first shaft whereby the first link is turned together with the first shaft. A second link includes a first end and a second end, the first end of the second link is connected to the second shaft whereby the second link is turned together with the second shaft, the second end of the second link being rotatably connected to the second end of the first link.

A second structure is a two dimensional drive system including a base having a pair of X-guides provided on the base, the X-guides being arranged in parallel in an X-direction. A pair of Y-guides are provided on the base, the Y-guides being arranged in parallel in a Y-direction perpendicular to the X-direction. An X-rod is arranged in the X-direction, each end of the X-rod being slidably attached to each of the Y-guides whereby the X-rod is capable of moving along the Y-guides in the Y-direction. A Y-rod is arranged in the Y-direction, each end of the Y-rod being slidably attached to each of the X-guides whereby the Y-rod is capable of moving along the X-guides in the X-direction. A moving body is capable of moving on the X-rod and the Y-rod in the X- and Y-directions. A first driving means, which has a first shaft, is provided for rotating the first shaft, the first driving means is provided to the base. A second driving means, which has a second shaft, is provided for rotating the second shaft, the second driving means is provided to the moving body. A first link includes a first end and a second end, the first end of the first link is connected to the first shaft whereby the first link is turned together with the first shaft. A second link includes a first end and a second end, the first end of the second link being connected to the second shaft whereby the second link is turned together with the second shaft, the second end of the second link being rotatably connected to the second end of the first link.

In the first structure, the output force of the first and the second driving means, which are forced to rotate the first and the second shafts, turns the first and the second links, so that the rod is moved along the guides in the X-direction, and the moving body is moved along the rod in the Y-direction. With the movement of the rod and the moving body, the moving body is capable of moving in the X- and the Y-directions.

In the second structure, the output force of the first and the second driving means, which are forced to rotate the first and the second shafts, turns the first and the second links, so that the X-rod is moved along the Y-guides in the Y-direction, and the Y-rod is moved along the X-guides in the X-direction. With the movement of the X- and the Y-rods the moving body is capable of moving in the X- and the Y-directions.

In the present invention, the drive system has no ball bearing screws, so that the manufacturing cost and noise during operation can be lower.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

The First Embodiment will be explained with reference to FIGS. 1 and 2.

Figure 1:
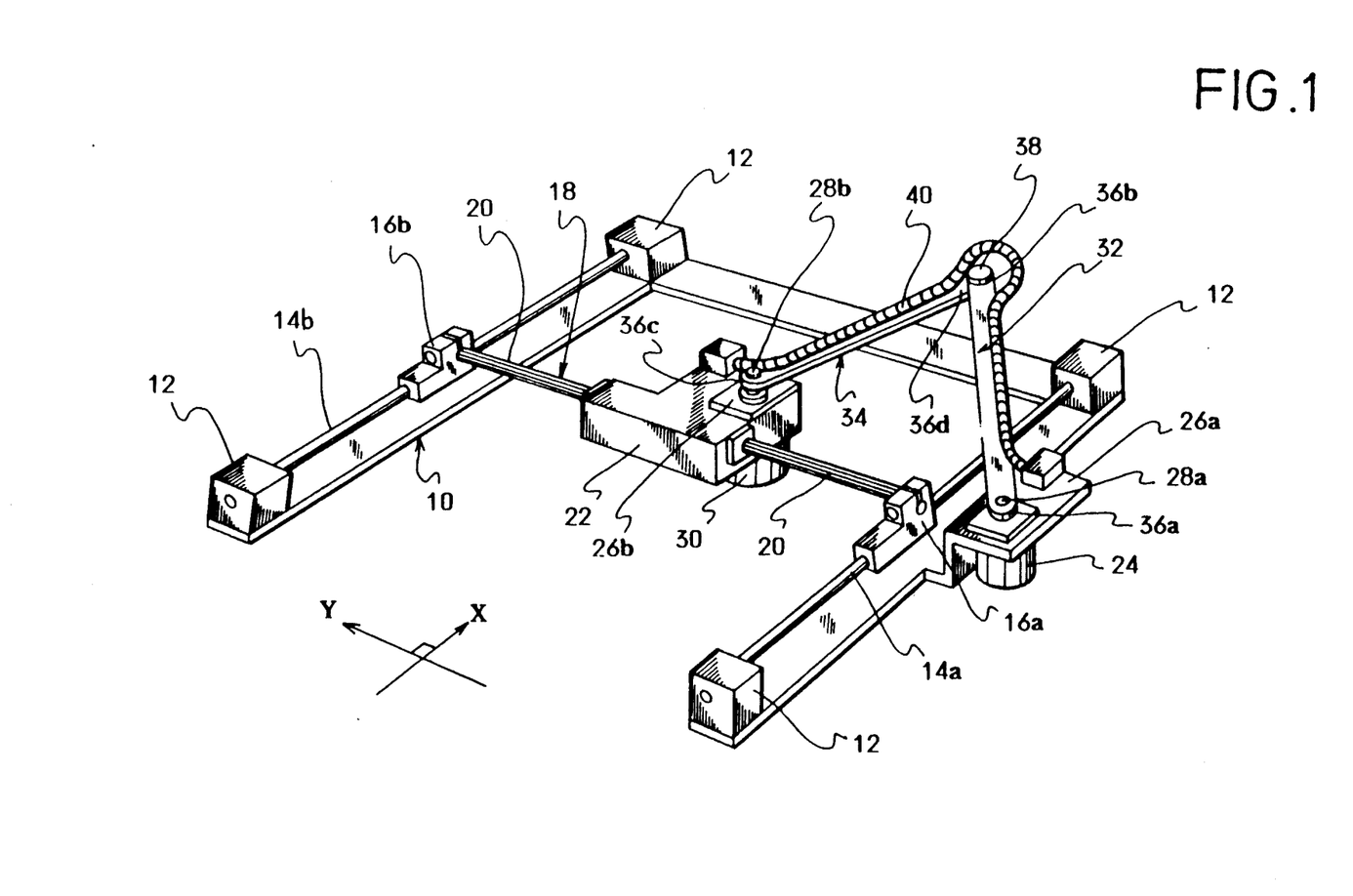
FIG. 1 is a perspective view of a First Embodiment.

In FIG. 1, a base 10 is formed like a U-shape. There are provided supporting boxes 12 at front ends and corners of the base 10.

Guides 14a and 14b are arranged in an X-direction. The guides 14a and 14b are metal rods. Each end of the guides 14a and 14b is respectively fixed at the boxes 12.

Note that, linear guides can be used instead of the rod guides 14a and 14b.

Travellers 16a and 16b slidably cover over the guides 14a and 14b. The travellers 16a and 16b are capable of moving along the guides 14a and 14b in the X-direction.

A rod 18 is a metal rod. The rod 18 is arranged in a Y-direction perpendicular to the guides 14a and 14b. Each end of the rod 18 is respectively fixed at the travellers 16a and 16b. The rod 18 is capable of moving in the X-direction with the movement of the travellers 16a and 16b. While moving in the X-direction, the rod 18 is capable of maintaining the right angle with respect to the guides 14a and 14b. A plurality of spline grooves 20, are grooved in the Y-direction, on the outer circumferential face of the rod 18. Note that, if a plurality of rods 18 are used, no spline grooves 20 are required. And linear guide can be used instead of the rod 18.

A slider 22, which is an example of the moving body, is a cubical block. The rod 18 is pierced through the slider 22, and the slider 22 engages with the spline grooves 20 of the rod 18 so as to prevent the slider's rotation from rotating thereon. With this structure, the slider 22 is capable of moving on the rod 18 in the Y-direction without rotating thereon. Note that, as described above, if a plurality of rods 18 are used, the rods 18 are capable of preventing the slider's rotation. Tools, robot heads for machining, measuring equipments, works to be machined, etc. can be attached to the slider 22.

A first servo motor 24, which is an example of the first driving means, is fixed at an extended section 26a, which extends from the outer edge of the base 10. The rotational speed of a motor shaft 28a, which is an example of the first shaft, is reduced by a reduction gears (not shown). The upper end of the motor shaft 28a projects from the upper face of the extended section 26a.

A second servo motor 30, which is an example of the second driving means, is fixed at an extended section 26b, which extends from the slider 22. The rotational speed of a motor shaft 28b, which is an example of the second shaft, is also reduced by a reduction gears (not shown). The upper end of the motor shaft 28b also projects from the upper face of the extended section 26b.

A first end 36a of a first link 32 is fixed to the motor shaft 28a of the first servo motor 24. By rotating the first servo motor 24, a second end 36b of the first link 32 is turned with the motor shaft 28a.

A first end 36c of a second link 34 is fixed to the motor shaft 28b of the second servo motor 30. By rotating the second servo motor 30, a second end 36d of the second link 34 is turned with the motor shaft 28b. The second end 36d of the second link 34 is rotatably connected to the second end 36b of the first link 32 by a pin 38.

Electric cables are provided for supplying electric power to the second servo motor 30 and air tubes are provided for supplying compressed air to robot heads. The electric cables and air tubes can be attached to the slider 22 and passed through a flexible cable chain 40. The cable chain 40 is fixed on the first link 32 and the second link 34 by fixing means (not shown). The cable chain 40 is capable of flexibly moving with the first link 32 and the second link 34.

In the present embodiment, the first servo motor 24 and the second servo motor 30 are controlled by a control system, which includes a microprocessor. The control system will be explained with reference to FIG. 2.

Figure 2:
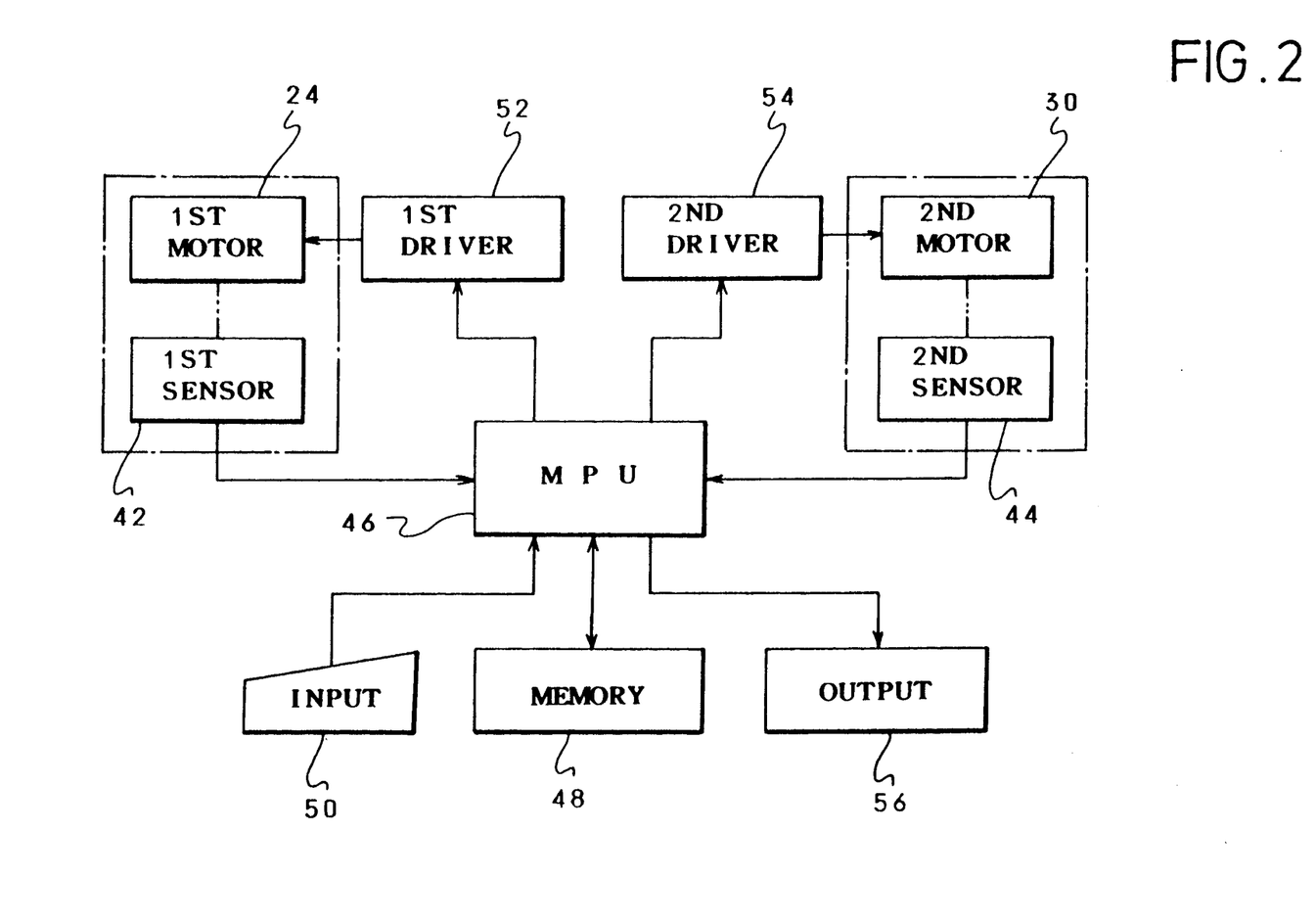
FIG. 2 is a block diagram showing a control system of the First Embodiment.

In FIG. 2, the first servo motor 24 has a first sensor 42, which includes an encoder, for detecting the rotational angle of the motor shaft 28a. The second servo motor 30 also has a second sensor 44, which includes an encoder, for detecting the rotational angle of the motor shaft 28b.

A microprocessor (MPU) 46 controls the drive system on the basis of programs and stored data, which are stored in a memory unit 48, e.g. ROMs, RAMs, IC cards, commands and data, which are inputted by an input unit, e.g. keyboard. The rotational angle of the motor shafts 28a and 28b are controlled by controlling a first driver circuit 52 and a second driver circuit 54. The first driver circuit 52 drives the first servo motor 24 on the basis of data sent from the first sensor 42; the second driver circuit 54 drives the second servo motor 30 on the basis of data sent from the second sensor 44. By controlling the rotational angle of the motor shafts 28a and 28b, the X-Y position of the slider 22 can be controlled.

An output unit 56, e.g. displays, shows information processed, data inputted or calculated, etc..

Successively, the two dimentional drive system of the present embodiment will be explained.

Upon driving the first servo motor 24, the motor shaft 28a rotates, and the first link 32 turns round the first end 36a. By turning the first link 32, the X-Y position of the second end 36b of the first link 32 changes, and a first force, which attempts to move the slider 22, is applied to the slider 22.

Upon driving the second servo motor 30, the motor shaft 28b rotates, and the second link 34 turns round the first end 36c. By turning the second link 34, the X-Y position of the second end 36d of the second link 34 changes, and a second force, which attempts to move the slider 22, is applied to the slider 22 via the second link 34.

The position of the first end 36a of the first link 32 is fixed. Therefore, upon applying the first force and the second force to the slider 22, a resultant force of the two makes the slider 22 move. The X-Y movement of the slider 22 is correlative to the rotation of the motor shafts 28a and 28b. The correlation data between them has been previously stored in the memory unit 48 as control data. The MPU 46 controls the first servo motor 24 and the second servo motor 30 on the basis of the correlation data. Note that, the speed of the slider 22 may be adjusted by adjusting the rotational speed of the motor shafts 28a and 28b, and the length of the first and the second links 32 and 34, so that high speed operation of the slider 22 can be realized.

Figure 3:
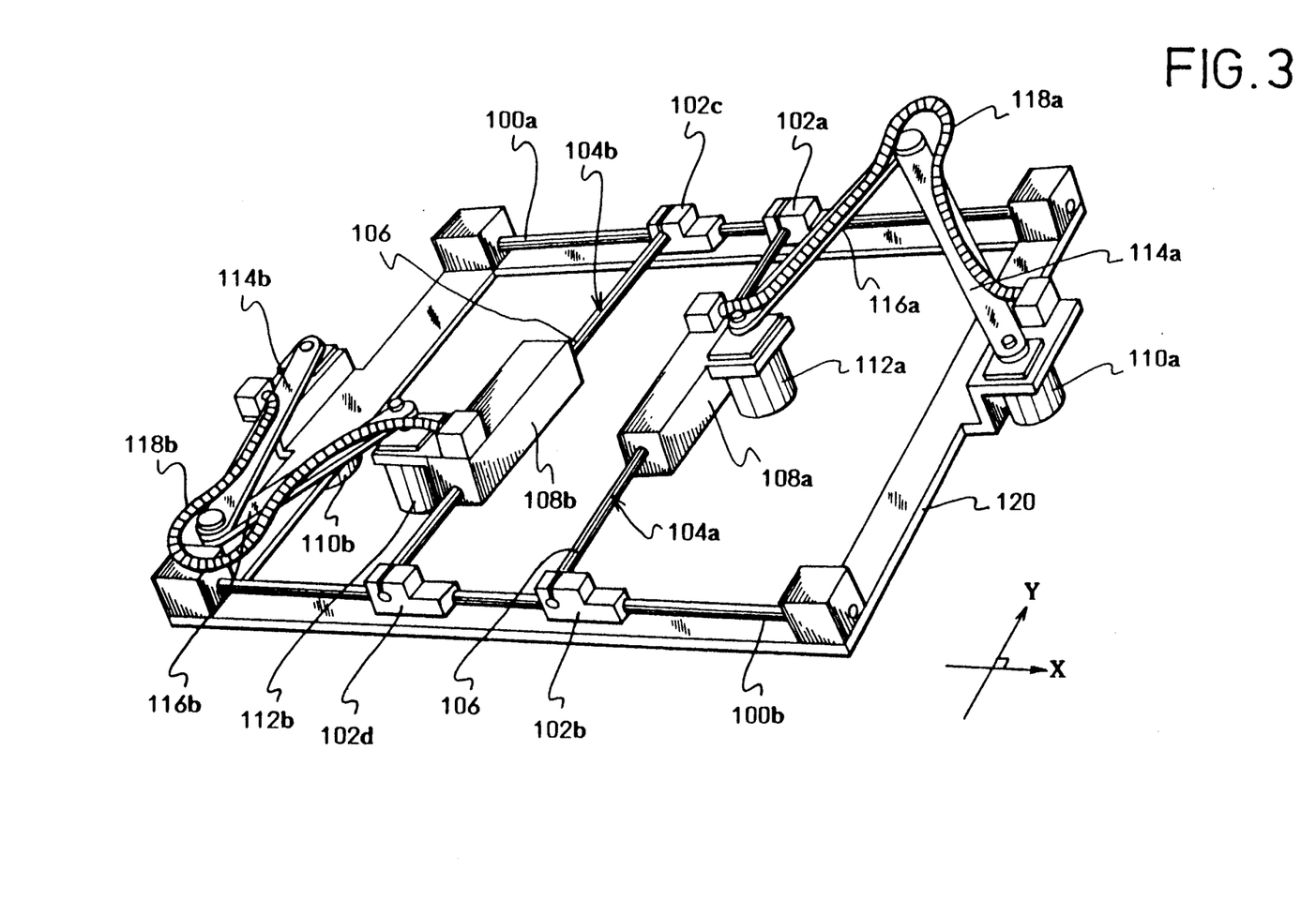
FIG. 3 is a perspective view of a Second Embodiment.

The Second Embodiment will be explained with reference to FIG. 3. Note that, the Second Embodiment is a modified embodiment of the First Embodiment, so elements explained in the First Embodiment are assigned the same names and explanation will be omitted.

In the present embodiment, a first group of travellers 102a and 102b and a second group of travellers 102c and 102d are provided to guides 100a and 100b to movably cover them.

A rod 104a is spanned between the travellers 102a and 102b; a rod 104b is spanned between the travellers 102c and 102d. Spline grooves 106 are grooved on the outer circumferential face of the rods 104a and 104b.

Sliders 108a and 108b respectively cover the rods 104a and 104b. Sliders 108a and 108b are capable of moving on the rods 104a and 104b. Sliders 108a and 108b engage with the spline grooves 106 to prevent the rotation.

Elements for driving the slider 108a, i.e. a first servo motor 110a, a second servo motor 112a, a first link 114a, a second link 116a, and a cable chain 118a, are provided on the right side of a base 120. On the other hand, elements for driving the slider 108a, i.e. a first servo motor 110b, a second servo motor 112b, a first link 114b, a second link 116b, and a cable chain 118b, are provided on the left side of the base 120 so as not to prevent mutual interference. With this structure, upon driving the first servo motors 110a and 110b and the second servo motors 112a and 112b, the sliders 108a and 108b are moved along the common guides 100a and 100b together with the rods 104a and 104b in the X-direction; the sliders 108a and 108b are respectively moved on the rods 104a and 104b in the Y-direction. Therefore, the sliders 108a and 108b are capable of independent movement as far as one of them does not interfere with the other.

Note that, in the drive system of the present embodiment, the movement of the sliders 108a and 108b are also controlled by a computer system as well as the First Embodiment.

Figure 4:
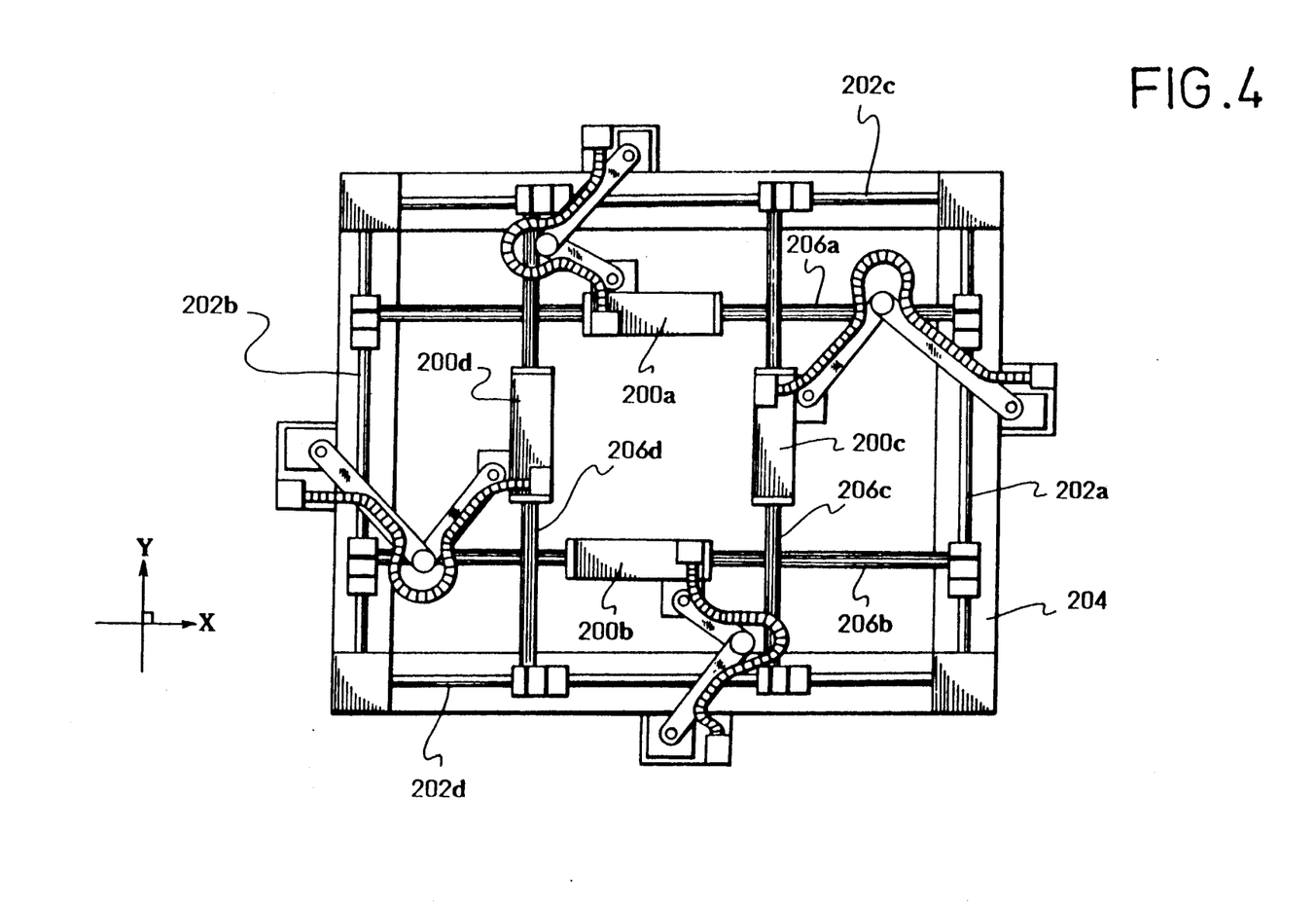
FIG. 4 is a plan view of a Third Embodiment.

The Third Embodiment will be explained with reference to FIG. 4. Note that, the Third Embodiment is a modified embodiment of the Second Embodiment, so elements explained in the former embodiments are assigned the same names and explanation will be omitted.

In the present embodiment, a couple of the drive systems of the Second Embodiment are positioned on a base 204. And rods 206a, 206b, 206c and 206d are arranged to mutually cross at right angle.

The drive system for driving sliders 200a and 200b is provided beneath the drive system for driving sliders 200c and 200d. Guides 202a and 202b for the sliders 200a and 200b are provided on the base 204 in the Y-direction, and the rods 206a and 206b are provided in the X-direction perpendicular to the guides 202a and 202b. On the other hand, Guides 202c and 202d for the sliders 200c and 200d are provided on the base 204 in the X-direction, and the rods 206c and 206d are provided in the Y-direction perpendicular to the guides 202c and 202d. With this structure, the sliders 200a, 200b, 200c and 200d are capable of independent movement as far as mutual interference does not occur.

Note that, in the drive system of the present embodiment, the movement of the sliders 200a, 200b, 200c are also controlled by a computer system as well as the First Embodiment.

The Fourth Embodiment will be explained with reference to FIG. 5.

Figure 5:
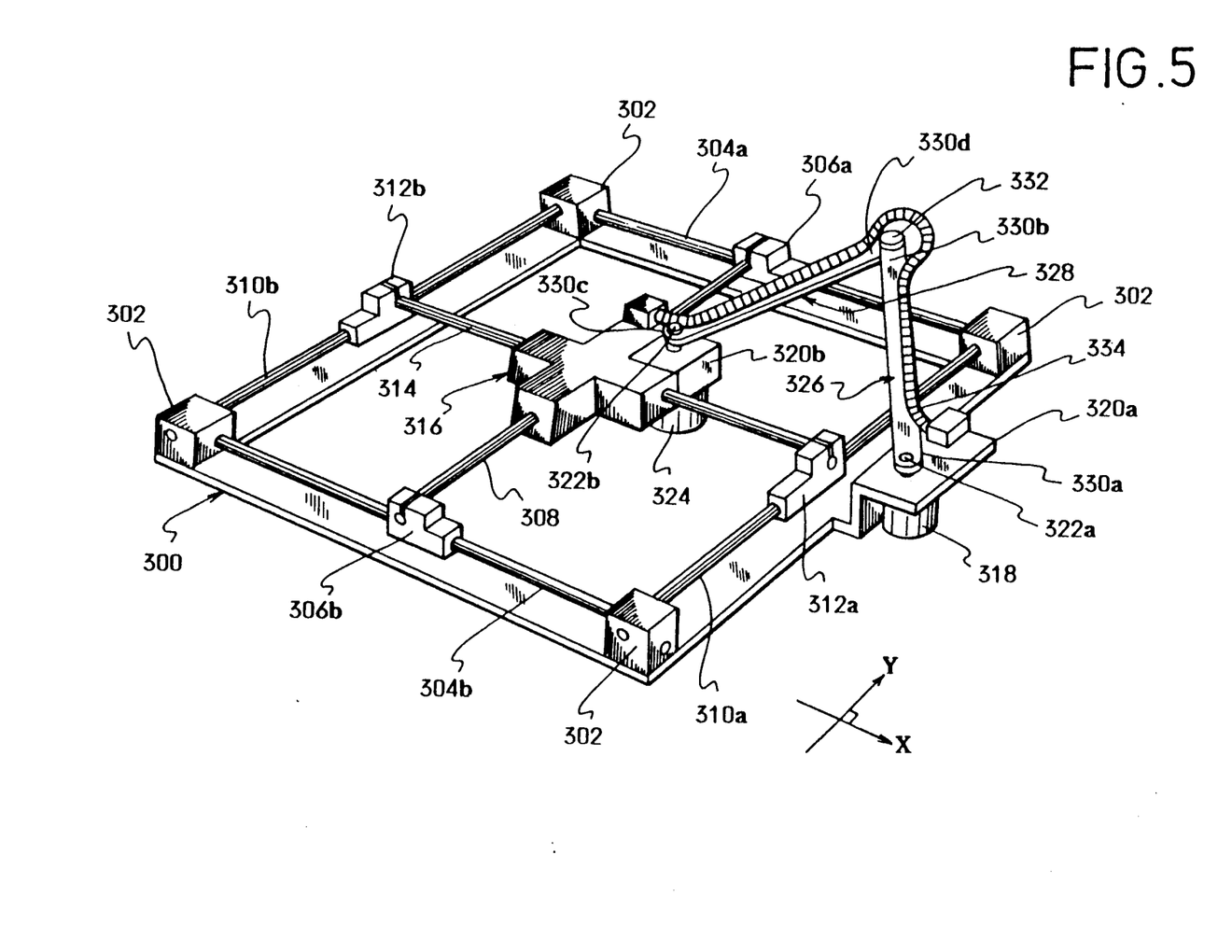
FIG. 5 is a perspective view of a Fourth Embodiment.

In FIG. 5, a base 300 is formed like a hollow frame. Supporting boxes 302 are provided at corners of the base 300.

X-guides 304a and 304b are arranged in an X-direction. The X-guides 304a and 304b are metal rods. Each end of the X-guides 304a and 304b is respectively fixed at the boxes 302. Note that, linear guides can be used instead of the X-guides 304a and 304b.

First travellers 306a and 306b slidably cover over the X-guides 304a and 304b. The first travellers 306a and 306b are capable of moving along the X-guides 304a and 304b in the X-direction.

A Y-rod 308 is a metal rod. The Y-rod 308 is arranged in a Y-direction perpendicular to the X-guides 304a and 304b. Each end of the Y-rod 308 is respectively fixed at the first travellers 306a and 306b. The Y-rod 308 is capable of moving in the X-direction with the movement of the first travellers 306a and 306b. While moving in the X-direction, the Y-rod 308 is capable of maintaining the right angle with respect to the X-guides 304a and 304b. There are no spline grooves on the outer circumferential face of the Y-rod 308. Note that, linear guide can be used instead of the Y-rod 308.

Y-guides 310a and 310b are arranged in the Y-direction. The Y-guides 310a and 310b are metal rods. Each end of the Y-guides 310a and 310b is respectively fixed at the boxes 302. Note that, linear guides can be used instead of the Y-guides 310a and 310b.

Second travellers 312a and 312b slidably cover over the Y-guides 310a and 310b. The second travellers 312a and 312b are capable of moving along the Y-guides 310a and 310b in the X-direction.

An X-rod 314 is a metal rod. The X-rod 314 is arranged in the X-direction perpendicular to the Y-guides 310a and 310b. Each end of the X-rod 314 is respectively fixed at the second travellers 312a and 312b. The X-rod 314 is capable of moving in the Y-direction with the movement of the second travellers 312a and 312b. While moving in the Y-direction, the X-rod 314 is capable of maintaining the right angle with respect to the Y-guides 310a and 310b. There are no spline grooves on the outer circumferential face of the X-rod 314. Note that, linear guide can be used instead of the X-rod 314.

A slider 316, which is an example of the moving body, is a cubical block. The Y-rod 308 and the X-rod 314 are pierced through the slider 316. With this structure, the Y-rod 308 and the X-rod 314 prevent the slider 316 from rotating, so no spline grooves are required. The slider 316 is capable of moving on the Y-rod 308 and the X-rod 314 in the X- and the Y-directions. Tools, robot heads for machining, measuring equipments, works to be machined, etc. can be attached to the slider 316.

A first servo motor 318, which is an example of the first driving means, is fixed at an extended section 320a, which is extended from the outer edge of the base 300. The rotational speed of a motor shaft 322a, which is an example of the first shaft, is reduced by a reduction gears (not shown). The upper end of the motor shaft 322a projects from the upper face of the extended section 320a.

A second servo motor 324, which is an example of the second driving means, is fixed at an extended section 320b, which is extended from the slider 316. The rotational speed of a motor shaft 322b, which is an example of the second shaft, is also reduced by a reduction gears (not shown). The upper end of the motor shaft 322b is also projected from the upper face of the extended section 320b.

A first end 330a of a first link 326 is fixed to the motor shaft 322a of the first servo motor 318. By rotating the first servo motor 318, a second end 330b of the first link 326 is turned with the motor shaft 322a.

A first end 330c of a second link 328 is fixed to the motor shaft 322b of the second servo motor 324. By rotating the second servo motor 324, a second end 330d of the second link 328 is turned with the motor shaft 322b. The second end 330d of the second link 328 is rotatably connected to the second end 330b of the first link 326 by a pin 332.

Electric cables for supplying electric power to the second servo motor 324 and air tubes for supplying compressed air to robot heads, which can be attached to the slider 316, are passed through a flexible cable chain 334. The cable chain 334 is fixed on the first link 326 and the second link 328 by fixing means (not shown). The cable chain 334 is capable of flexibly moving with the first link 326 and the second link 328.

In the present embodiment, the first servo motor 318 and the second servo motor 324 are controlled by a computer system as well as the First Embodiment, so explanation of the computer system will be omitted.

Successively, the two dimentional drive system of the present embodiment will be explained.

Upon driving the first servo motor 318, the motor shaft 322a rotates, and the first link 326 turns round the first end 330a. By turning the first link 326, the X-Y position of the second end 330b of the first link 326 changes, and a first force, which attempts to move the slider 316, is applied to the slider 316 via the second link 328.

Upon driving the second servo motor 324, the motor shaft 322b rotates, and the second link 328 turns round the first end 330c. By turning the second link 328, the X-Y position of the second end 330d of the second link 328 changes, and a second force, which attempts to move the slider 316, is applied to the slider 316.

The position of the first end 330a of the first link 326 is fixed. Therefore, upon applying the first force and the second force to the slider 316, a resultant force of the both makes the slider 316 move. The X-Y movement of the slider 316 is correlative to the rotation of the motor shafts 322a and 322b. The correlation data among them have been previously stored in the computer control system, so the computer control system the first servo motor 318 and the second servo motor 324 on the basis of the correlation data. Note that, the speed of the slider 316 may be adjusted by adjusting the rotational speed of the motor shafts 322a and 322b, and the length of the first and the second links 326 and 328, so that high speed operation of the slicer 316 can be realized.

Figure 6:
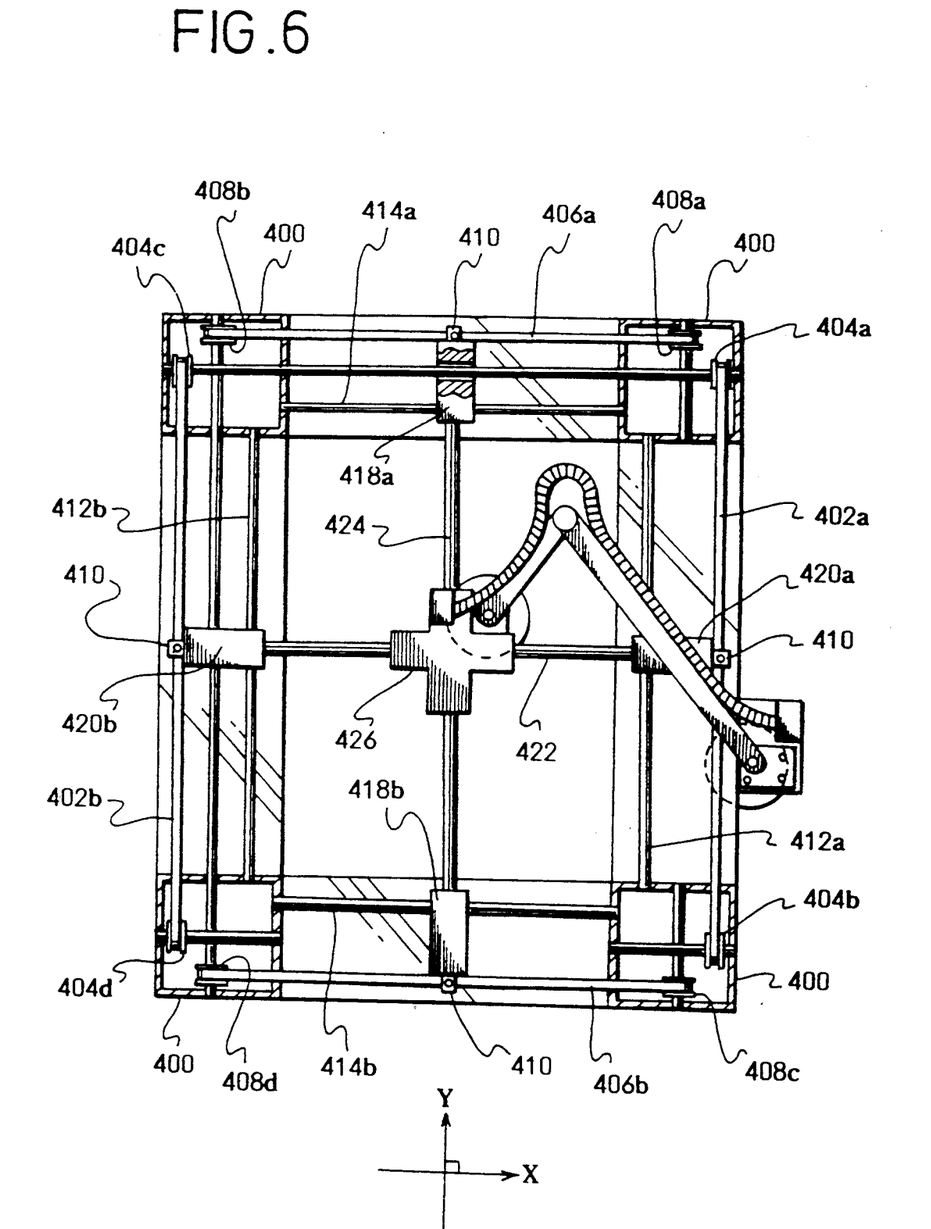
FIG. 6 is a plan view of a Fifth Embodiment.

Fifth Embodiment will be explained with reference to FIG. 6. Note that, the Fifth Embodiment is a modified embodiment of the Fourth Embodiment, so elements explained in the Fourth Embodiments are assigned the same names and explanation will be omitted.

In the present embodiment, the drive system has an X-restraining means for restraining the inclination of an X-rod 422 with respect to an X-direction and a Y-restraining means for restraining the inclination of a Y-rod 424 with respect to a Y-direction.

The X-restraining means has first timing belts 402a and 402b, and first timing pulleys 404a, 404b, 404c and 404d; the Y-restraining means has second timing belts 406a and 406b, and second timing pulleys 408a, 408b, 408c and 408d.

The first timing belts 402a and 402b is arranged in parallel to Y-guides 412a and 412b. The first timing belt 402a is engaged with the first timing pulleys 404a and 404b, which are accommodated in boxes 400. On the other hand, the first timing belt 402b is engaged with the first timing pulleys 404c and 404d, which are accommodated in boxes 400.

The second timing belts 406a and 406b is arranged in parallel to X-guides 414a and 414b. The second timing belt 406a is engaged with the second timing pulleys 408a and 408b, which are accommodated in boxes 400. On the other hand, the second timing belt 406b is engaged with the second timing pulleys 408c and 408d, which are accommodated in boxes 400.

First travellers 418a and 418b are respectively connected to the second timing belts 406a and 406b by clasps 410. The second timing belts 406a and 406b are driven by the movement of the first travellers 418a and 418b. On the other hand, second travellers 420a and 420b are respectively connected to the first timing belts 402a and 402b by clasps 410. The first timing belts 402a and 402b are driven by the movement of the second travellers 420a and 420b.

With the X- and the Y-restraining means, the inclination of the X-rod 422 with respect to an X-direction and the inclination of the Y-rod 424 with respect to a Y-direction can be prevented. By preventing the inclination, positioning accuracy of a slider 426 can be higher, and noise and vibration during high speed operation of the slider 426 can be prevented.

Figure 7:
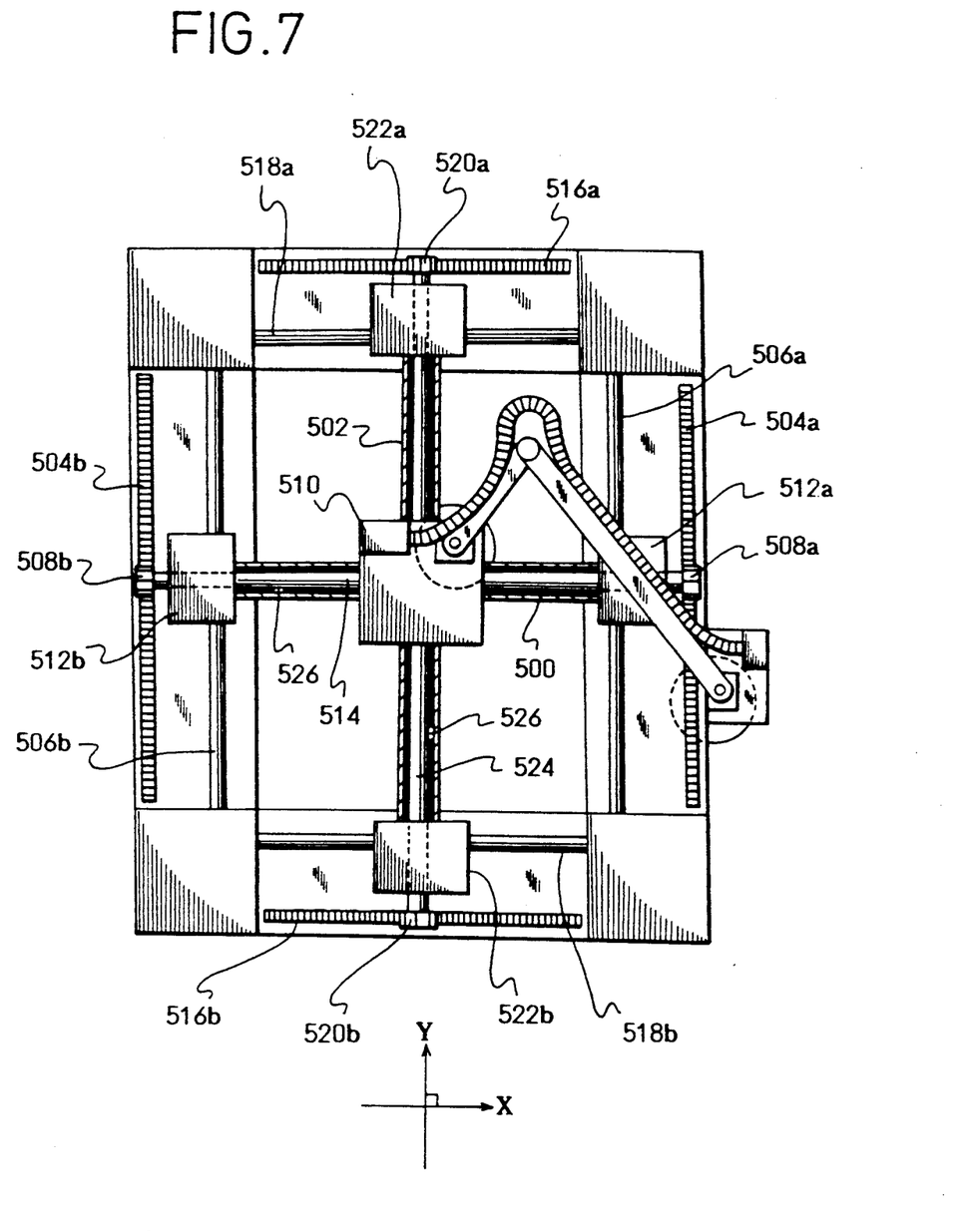
FIG. 7 is a plan view of a Sixth Embodiment.

The Sixth Embodiment will be explained with reference to FIG. 7. Note that, the Sixth Embodiment is also a modified embodiment of the Fourth Embodiment, so elements explained in the Fourth Embodiments are assigned the same names and explanation will be omitted.

In the present embodiment, the drive system also has an X-restraining means for restraining the inclination of an X-rod 500 with respect to an X-direction and a Y-restraining means for restraining the inclination of a Y-rod 502 with respect to a Y-direction.

The X-restraining means includes first racks 504a and 504b, a first axle 514 and first pinions 508a and 508b; the Y-restraining means has second racks 516a and 516b, a second axle 524 and second pinions 520a and 520b.

The first racks 504a and 504b are arranged in parallel to Y-guides 506a and 506b. The first pinions 508a and 508b are rotatably engaged with the first racks 504a and 504b. The first pinions 504a and 504b are respectively fixed at each end of the first axle 514. The X-rod 500 is a hollow pipe, and the first axle 514 is rotatably pierced therethrough. The first axle 514 is also rotatably through second travellers 512a and 512b.

The second racks 516a and 516b are arranged in parallel to X-guides 518a and 518b. The second pinions 520a and 520b are rotatably engaged with the second racks 516a and 516b. The second pinions 520a and 520b are respectively fixed at each end of the second axle 524. The Y-rod 502 is a hollow pipe, and the second axle 524 is rotatably pierced therethrough. The second axle 524 is also rotatably through first travellers 522a and 522b.

By the movement of the first travellers 522a and 522b, the second pinions 520a and 520b rolls on the second racks 516a and 516b engaging therewith. On the other hand, by the movement of the second travellers 512a and 512b, the first pinions 508a and 508b rolls on the first racks 504a and 504b engaging therewith.

With the X- and the Y-restraining means, the inclination of the X-rod 500 with respect to an X-direction and the inclination of the Y-rod 502 with respect to a Y-direction can be prevented. By preventing the inclination, positioning accuracy of a slider 510 can be higher, and noise and vibration during high speed operation of the slider 510 can be prevented.

Note that, the hollow X-rod 500 and the hollow Y-rod 502 are filled with lubricant 526, e.g. grease, so that abrasion and noise occurring between the outer circumferential faces of the first and the second axles 514 and 524 and the inner face of the X- and the Y-rods 500 and 502 can be prevented.

In the above described embodiments, the first driving means and the second driving means are electric servo motors, but the driving means are not limited to electric servo motors, air driven rotary actuators and hydraulic rotary actuators, for example, can be used as the first and the second driving means.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A two dimensional drive system, comprising:
   a base;
   a pair of guides being provided on said base, said guides being arranged in parallel in an X-direction;
   a rod being arranged in a Y-direction perpendicular to the X-direction, each end of said rod being slidably attached to each of said guides whereby said rod is capable of moving along said guides in the X-direction;
   a moving body being capable of moving on said rod in the Y-direction;
   first driving means, which has a first shaft, for rotating the first shaft, said first driving means being provided to said base;
   second driving means, which has a second shaft, for rotating the second shaft, said second driving means being provided to said moving body;
   a first link having a first end and a second end, the first end of said first link being connected to said first shaft whereby said first link is turned together with the first shaft; and
   a second link having a first end and a second end, the first end of said second link being connected to said second shaft whereby said second link is turned together with the second shaft, the second end of said second link being rotatably connected to the second end of said first link.

2. The two dimensional drive system according to claim 1,
   further comprising control means for controlling said first driving means and said second driving means so as to move said moving body in the X- and Y-directions.

3. The two dimensional drive system according to claim 1,
   wherein said first driving means and said second driving means are servo motors.

4. The two dimensional drive system according to claim 1,
   wherein a plurality of said rods are slidably attached to said guides;
   a plurality of said moving bodies are respectively provided on each of said rods; and
   a plurality of driving mechanisms, each of which includes said first driving means, said second driving means, said first link and said second link, are capable of respectively driving said moving bodies.

5. The two dimensional drive system according to claim 4,
   further comprising control means for controlling a plurality of said first driving means and a plurality of said second driving means so as to move said moving bodies in the X- and Y-directions.

6. The two dimensional drive system according to claim 4,
   wherein a plurality of said first driving means and a plurality of said second driving means are servo motors.

7. A two dimensional drive system, comprising:
   a base;
   a pair of X-guides being provided on said base, said X-guides being arranged in parallel in an X-direction;
   a pair of Y-guides being provided on said base, said Y-guides being arranged in parallel in a Y-direction perpendicular to the X-direction;
   an X-rod being arranged in the X-direction, each end of said X-rod being slidably attached to each of said Y-guides whereby said X-rod is capable of moving along said Y-guides in the Y-direction;
   a Y-rod being arranged in the Y-direction, each end of said Y-rod being slidably attached to each of said X-guides whereby said Y-rod is capable of moving along said X-guides in the X-direction;
   a moving body being capable of moving on said X-rod and said Y-rod in the X- and Y-directions;
   first driving means, which has a first shaft, for rotating the first shaft, said first driving means being provided to said base;
   second driving means, which has a second shaft, for rotating the second shaft, said second driving means being provided to said moving body;
   a first link having a first end and a second end, the first end of said first link being connected to said first shaft whereby said first link is turned together with the first shaft; and
   a second link having a first end and a second end, the first end of said second link being connected to said second shaft whereby said second link is turned together with the second shaft, the second end of said second link being rotatably connected to the second end of said first link.

8. The two dimensional drive system according to claim 7,
   further comprising control means for controlling said first driving means and said second driving means so as to move said moving body in the X- and Y-directions.

9. The two dimensional drive system according to claim 7,
   wherein said first driving means and said second driving means are servo motors.

10. The two dimensional drive system according to claim 7,
    further comprising:
    X-restraining means for restraining the inclination of said X-rod with respect to the X-direction; and
    Y-restraining means for restraining the inclination of said Y-rod with respect to the Y-direction.

11. The two dimensional drive system according to claim 10,
    wherein,
    said X-restraining means comprising:
    a pair of first timing belts being arranged parallel to said Y-guides; and
    two pairs of first timing pulleys being engaged with each first timing belt, and
    said Y-restraining means comprising:
    a pair of second timing belts being arranged parallel to said X-guides; and two pairs of second timing pulleys being engaged with each second timing belt.

12. The two dimensional drive system according to claim 10,
wherein,
said X-restraining means comprising:
  a pair of first racks being arranged parallel to said Y-guides;
  a first axle being arranged in the X-direction and pierced through said moving body, said first axle being capable of turning on the axis thereof; and
  a pair of first pinions being respectively fixed at each end of said first axle, said first pinions being respectively engaged with each first rack, and
said Y-restraining means comprising:
  a pair of second racks being arranged parallel to said X-guides;
  a second axle being arranged in the Y-direction and pierced through said moving body, said second axle being capable of turning on the axis thereof; and
  a pair of second pinions being respectively fixed at each end of said second axle, said second pinions being respectively engaged with each second rack.

13. The two dimensional drive system according to claim 12,
wherein,
said X-rod is a hollow pipe and said first axle is pierced through said hollow X-rod, and
said Y-rod is a hollow pipe and said second axle is pierced through said hollow Y-rod.

14. The two dimensional drive system according to claim 13,
wherein said hollow X- and Y-rods are filled with lubricant.

* * * * *